(12) United States Patent
Algüera et al.

(10) Patent No.: US 8,844,680 B2
(45) Date of Patent: Sep. 30, 2014

(54) LUBRICATION SYSTEM WITH INTEGRATED ELECTRONICS

(75) Inventors: José Manuel Algüera, Aschaffenburg (DE); Swen Saupe, Mainz (DE)

(73) Assignee: Jost-Werke GmbH, Neu-Isenburg (DE)

( * ) Notice: Subject to any disclaimer, the term of this patent is extended or adjusted under 35 U.S.C. 154(b) by 277 days.

(21) Appl. No.: 12/998,448

(22) PCT Filed: Oct. 22, 2009

(86) PCT No.: PCT/EP2009/063914
§ 371 (c)(1),
(2), (4) Date: Apr. 21, 2011

(87) PCT Pub. No.: WO2010/046446
PCT Pub. Date: Apr. 29, 2010

(65) Prior Publication Data
US 2011/0233002 A1     Sep. 29, 2011

(30) Foreign Application Priority Data
Oct. 23, 2008   (DE) .......................... 10 2008 043 143

(51) Int. Cl.
*B60R 17/02*           (2006.01)

(52) U.S. Cl.
CPC ..................................... *B60R 17/02* (2013.01)
USPC ......................................................... 184/7.2

(58) Field of Classification Search
USPC ................. 184/7.2, 6.1, 3.2, 7.3, 7.4, 6.3, 6.4
See application file for complete search history.

(56) References Cited

U.S. PATENT DOCUMENTS

| 4,445,168 | A | * | 4/1984 | Petryszyn ........................ 700/21 |
| 4,969,318 | A | * | 11/1990 | Hudson et al. ............. 56/10.2 R |
| 5,182,720 | A |   | 1/1993 | Beck et al. |
| 5,195,612 | A | * | 3/1993 | Hahn et al. ..................... 184/6.4 |
| 5,417,308 | A | * | 5/1995 | Hartl .............................. 184/6.4 |
| 5,823,295 | A | * | 10/1998 | Griffith et al. ................ 184/6.4 |
| 6,874,599 | B1 | * | 4/2005 | Riskedal ..................... 184/105.3 |
| 7,059,450 | B2 | * | 6/2006 | O'Toole et al. ............. 184/105.1 |

FOREIGN PATENT DOCUMENTS

| DE | 24 58 711 A1 | 6/1976 |
| DE | 197 12 807 A1 | 10/1997 |
| EP | 1 209 038 A1 | 5/2002 |
| WO | WO 2006/084752 A1 | 8/2006 |

* cited by examiner

*Primary Examiner* — William E Dondero
*Assistant Examiner* — Mark K Buse
(74) *Attorney, Agent, or Firm* — Hudak, Shunk & Farine Co. LPA

(57) ABSTRACT

A lubrication system for a utility vehicle with a lubricating unit having a lubricant reservoir, a pump, and a distributor attached thereto to which supply lines to a plurality of lubrication points can be attached, and comprising a control module having at least two lubrication programs stored therein, wherein the pump initiates an ejection of grease in a cycle predetermined by the respective lubrication program. The object of the invention is to improve upon a lubrication system such that a change between lubrication programs and optionally the execution of an intermediate lubrication using an automatic lubrication system is possible during driving operations independent of the presence of a higher level onboard electronics system. The object is accomplished in that the lubricating unit is connected directly to an input and display device disposed in the vehicle or at other accessible places on the vehicle, the input and display device used to switch between lubrication programs and to initiate an intermediate lubrication.

21 Claims, 1 Drawing Sheet

LUBRICATION SYSTEM WITH INTEGRATED ELECTRONICS

FIELD OF THE INVENTION

The invention concerns a lubrication system for a utility vehicle with a lubricating unit, comprising a lubricant reservoir, a pump, and a distributor attached thereto, to which supply lines to a plurality of lubrication points can be attached, and a control module with at least two lubrication program stored therein, wherein the pump initiates an ejection of grease in a cycle predetermined by the respective lubrication program.

BACKGROUND OF THE INVENTION

Such lubrication systems are also known as central lubrication systems and serve to supply grease to a plurality of lubrication locations on the vehicle, so that even in driving operation a deficiency of grease with concomitant rapid wearing of moving parts is prevented. Typical lubrication locations are various areas of the fifth wheel or the steering knuckle pins of the vehicle.

From the prior art there is known, for example, EP 1 209 038 A1, which likewise discloses a lubricant reservoir and a pump, which delivers the lubricant to a distributor and to at least one direct line running directly to the lubrication location. In a lateral region of the lower pump segment is arranged a control unit, with which it is possible to set certain control parameters, such as the cycle time and the lubrication time. Alternatively, it is proposed to connect the lubricant pump or central lubrication system by an interface to the central onboard computer of the vehicle, which makes the control and monitoring, as well as the operation of the central lubrication system much more comfortable. A separate control unit is not needed with this configuration.

Thus, in the above-described central lubrication system, the higher-level electronics of the vehicle located in the on-board computer activates the lubrication system and carries out diagnostic functions for trouble-shooting. The higher-level electronics of the vehicle is usually also able to activate the central lubrication system with different lubrication programs, so that the supply of lubricant is satisfied also for various operating conditions of the vehicle. In long-haul operation, of course, less grease is required for the axles and the fifth wheel than when the vehicle is operated in the construction site duty.

The drawback of these now widely used lubrication systems is that the customer must order a vehicle with a higher-level vehicle electronics in order to take advantage of the above-described ease of operation. The extensive higher-level electronics, however, is usually not needed at all by the customer, except for operating the central lubrication system. Furthermore, the selection of the lubrication program must be done by a service shop with an appropriate diagnostic and operating tool.

A generic prior art is constituted by WO 2006/084752 A1, with a lubrication system for the exclusive supplying of grease to the fifth wheel. The components of this known lubrication system, besides the control unit, are to be situated in modular fashion in spatial proximity to the fifth wheel. Supplying of other lubrication locations is not contemplated.

U.S. Pat. No. 5,417,308 A proposes supplying lubricant exclusively to the fifth wheel by a lubrication system operated remotely from the driver's cabin. However, ejection of lubricant occurs only by a manual activation of an operating button by the driver. An automatic lubrication operation with several lubrication programs is not provided.

SUMMARY OF THE INVENTION

Consequently, the underlying problem of the invention is to improve a lubrication system so that a switching between the lubrication programs and optionally the performance of an intermediate lubrication with a self-contained lubrication system is possible, regardless of the presence of a higher-level on-board electronics, in driving operation.

The problem is solved according to the invention with a lubrication system in which the lubricating unit is connected directly to an input and display device disposed in the driver's cabin or another accessible location of the vehicle, by which a switching between the lubrication programs and the initiating of an intermediate lubrication is done. The term "directly" means a direct connection of the input and display device to the lubricating unit without an intervening circuit, especially the vehicle electronics.

The major benefit of the lubrication system is, first, that the lubrication programs can be switched without additional auxiliary means from the driver's cabin and thus an optimal lubrication program for the driving operation can always be selected. However, if an intermediate lubrication should be needed, this can be initiated by the driver during the driving operation. This occurs independently of the lubrication program that is being used. Since the lubrication system works self-contained and thus independently of the vehicle control unit and a higher-level electronics associated with this, the vehicle can be configured independently of the lubrication system when being purchased. Furthermore, the separating of the data streams lessens the risk of error messages and a faulty functioning of the lubrication system.

Preferably, the input and display device comprises a single push button and a signaling means. These enable a simple operation of the system and can be integrated into the dashboard of the vehicle with extremely small installation dimensions.

It has also proven to be especially advantageous for the control module to have a microprocessor. The microprocessor serves to store a plurality of different lubrication programs and furthermore enables a multiple usage of the push button and the signaling means. According to one preferred embodiment, the multiple usage of the single push button is provided for both the initiating of the intermediate lubrication and for the switching between the lubrication programs.

Advantageously, the signaling means is activated by the microprocessor with a frequency depending on the respective system status. For example, the signaling means can be a display light, whose frequency blinks depending on the system status, or changes to a steady light when the lubricant is nearly used up. When the push button is activated and an intermediate lubrication is carried out, the indicator light should come on after several seconds. When there is a fault in the lubrication system, the driver is informed as to this, especially by an initial rapid blinking. After minutes go by, the blinking can pass into a steady light. If the driver switches to program mode by pressing the push button before beginning his ride, this also is acknowledged by an appropriate signal sequence of the display light.

Advisedly, at most one connection for the electric power supply and one connection each for the push button and the signaling means are provided at the lubricating unit. Especially preferable is an alternative embodiment in which the connections of the electric power supply, the push button, and the signaling means are combined in a single common plug.

By reducing the number of plug-in contacts a frequent cause of error is eliminated, since it usually occurs after some time that moisture gets into the improperly connected or worn-down plug and causes malfunctions. Especially thanks to the use of a single plug a proper contacting of all poles occurs perforce. When using a single plug, advisedly a single control line going to the input and display device located in the driver's cabin is connected to it, which simplifies the installation, especially for a retrofitting.

Preferably, a level switch is arranged on the lubricant reservoir, which cooperates with the signaling means and tells the driver when the lubricant is about to run out.

Especially advantageous is an embodiment in which the components of the lubricating unit are arranged in a common housing. This embodiment likewise simplifies the modular retrofitting of the lubrication system on the vehicle, since the hooking up of the components now takes place inside the housing, and furthermore especially compact dimensions can be realized.

Favorably, the lubricating unit is electrically connected to the ignition of the vehicle. In this way, the electronics of the lubricating unit is switched off power when the vehicle is parked, thus sparing the vehicle battery. Furthermore, the turn on current when the ignition is activated can be used as a signal for a time limit, in order to go back to program mode when changing the lubrication programs.

It has proven to be advisable for the input and display device to have its own power supply. This can consist, for example, of a battery in the input and display device or a connection to the power supply of the vehicle. In this way, one avoids laying an additional line from the lubricating unit to the input and display device.

BRIEF DESCRIPTION OF THE DRAWINGS

For better comprehension, the invention will be explained more closely below by means of two figures. There are shown.

DETAILED DESCRIPTION OF THE INVENTION

Figure 1:
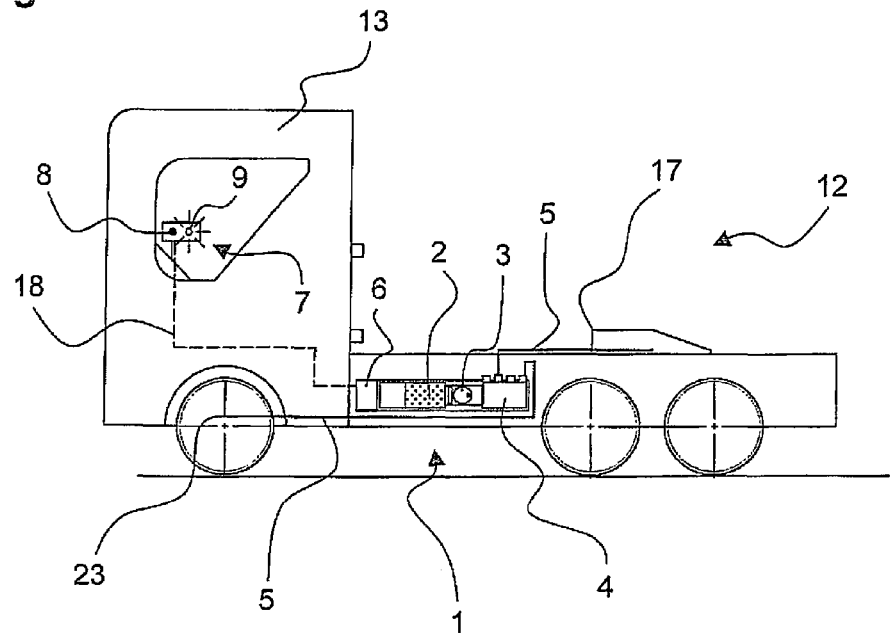
FIG. 1: a schematic side view of a lubrication system arranged on a semitrailer motor vehicle.

FIG. 1 shows, as the vehicle 12, a semitrailer motor vehicle with a lubrication system according to the invention arranged on it. The stationary lubricating unit 1 located on the chassis of the vehicle 12 comprises a lubricant reservoir 2, a pump 3 and a distributor 4. From the distributor 4, supply lines 5 run, for example, to lubricating points (not further shown) of a fifth wheel 17 and the front axle 23.

The lubricating unit 1, furthermore, has a control module 6, which is connected by a control line 18 to an input and display device 7 disposed in the driver's cabin 13. The input and display device 7 comprises a push button 8 and a signaling means 9 in the form of an indicator light. The control module 6 is an integral part of the lubricating unit 1.

There are several lubrication programs saved in memory in the control module 6, which ensure a cyclical operation of the pump 3 and thereby produce an ejection of the lubricant into the distributor 4 and the supply lines 5 connected to it.

When the ignition is switched on, the particular selected lubrication program is carried out in the lubricating unit 1. If the driver would like to perform an intermediate lubrication, he activates the push button 8 before or during the drive and thereby sets the pump 3 in operation outside of the scheduled program cycle. A proper performance of the intermediate lubrication function is acknowledged to the driver by a one-time blinking of the indicator light 9.

In the event that the lubricant supply in the lubricant reservoir 2 has nearly run out, this is sensed by a level switch 15 (see FIG. 2) and signaled to the driver, for example, by a steady lighting of the indicator light 9 of the input and display device 7.

The lubricating unit 1 is connected by the connector 11 (see FIG. 2) to the electric power supply of the vehicle 12 and is powered when the ignition is switched on. Thanks to the electrical connection of the lubricating unit 1, the lubrication system is already ready to operate. The lubrication system then functions with a basic setting and puts out a determined quantity of lubricant at regular intervals of time. The system status can be determined via the indicator light 9.

It is also possible with the switching on of the ignition, for example, by a longer depressing of the push button 8, to choose among the lubrication programs stored in the control module 6. This selecting of the lubrication program can only be done when the ignition is switched on and the vehicle's motor is still off, in order to prevent an unintentional changing of the lubrication program while driving.

Figure 2:
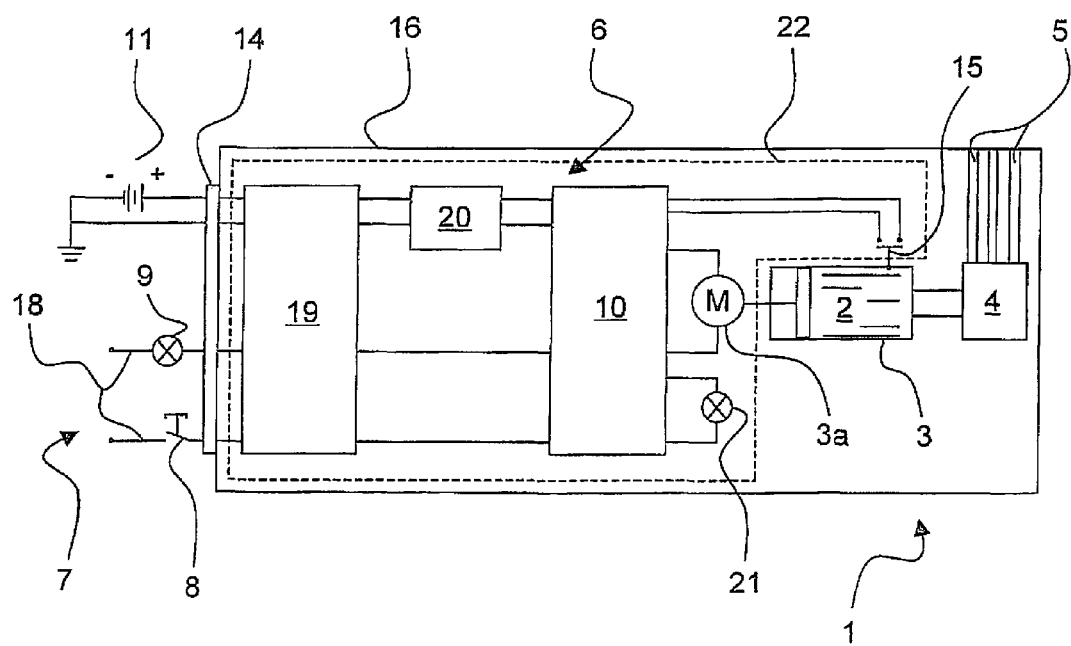
FIG. 2: a circuit diagram for the lubrication system of the invention.

FIG. 2 shows a schematic circuit diagram of the lubricating unit 1 and the connected input and display device 7. The lubricating unit 1 is supplied with electric energy via the connector 11. In order to protect the electronics and especially a microprocessor 10 of the control module 6 against external influences such as electromagnetic interference, electrostatic disruptions or wrong wiring connections, the lubricating unit 1 has a reverse voltage divider 19 and, connected to it, a voltage conditioning unit 20. With the voltage conditioning unit 20, the electric voltage of the vehicle 12 is adapted to the voltage level of the electronic components being used.

The lubrication programs are stored in a microprocessor 10, and the microprocessor 10 actuates the pump motor 3a of the pump 3 at different intervals of time according to the lubrication program. For diagnostic purposes, furthermore, an inner indicator light 21 is hooked up to the microprocessor 10.

The reverse voltage divider 19, the voltage conditioning unit 20, the microprocessor 10 and preferably also the pump motor 3a are located on a common circuit board 22. The pump motor 3a when operating causes the lubricant stockpiled in a lubricant reservoir 2 to be displaced in the pump 3. From the pump 3, the lubricant goes to the distributor 4 and from there to the supply lines 5.

After achieving a predetermined minimum amount of lubricant, the level switch 15 is closed. This change in the switch status of the level switch 15 is recognized by the microprocessor 10, which activates via the control line 18 to indicator light 9 of the input and display device 7 located in the driver's cabin.

The board 22 with the components located thereon and the pump 3 and the distributor 4 are accommodated compactly in a common housing 16.

The connection 11 to the electric power supply and the control lines 18 running to the push button 8 and the indicator light 9 are brought together at one end in a common plug 14. This is removably inserted from the outside into a complementary interface formed in the housing 16.

LIST OF REFERENCE NUMBERS 1 lubricating unit
2 lubricant reservoir
3 pump
3a pump motor
4 distributor
5 supply lines
6 control module
7 input and display device
8 push button
9 signaling means/indicator light
10 microprocessor
11 connector, electric power supply
12 vehicle
13 driver's cabin
14 plug
15 level switch
16 housing, lubricating unit
17 fifth wheel
18 control line
19 reverse voltage divider
20 voltage conditioning unit
21 indicator light, inside
22 circuit board
23 front axle

What is claimed is:

1. A lubrication system for a utility vehicle, comprising: a lubricating unit, comprising a lubricant reservoir, a pump, and a distributor attached thereto, to which supply lines to a plurality of lubrication points can be attached, and a control module with at least two different lubrication programs stored therein, wherein the pump initiates an ejection of grease in a cycle predetermined by one of the at least two different lubrication programs, wherein the lubricating unit is connected directly to an input and display device disposed in a driver's cabin or another accessible location of the vehicle, by which a switching between the different lubrication programs and an initiating of an intermediate lubrication is done, wherein the intermediate lubrication is initiated by the driver during the driving operation and occurs independently of one of the at least two different lubrication programs that is being used.

2. The lubrication system according to claim 1, wherein the input and display device comprises a single push button and a signaling display.

3. The lubrication system according to claim 2, wherein the control module has a microprocessor.

4. The lubrication system according to claim 3, wherein the microprocessor enables a multiple usage of the single push button for both the initiating of the intermediate lubrication and for the switching between the different lubrication programs.

5. The lubrication system according to claim 4, wherein the signaling display is activated by the microprocessor with a frequency depending on the respective system status.

6. The lubrication system according to claim 5, wherein at most one connection for the electric power supply and one connection each for the push button and the signaling display are provided at the lubricating unit.

7. The lubrication system according to claim 6, wherein connections of the electric power supply, the push button, and the signaling display are combined in a single common plug.

8. The lubrication system according to claim 7, wherein a level switch is arranged on the lubricant reservoir, which cooperates with the signaling display.

9. The lubrication system according to claim 8, wherein the components of the lubricating unit are arranged in a common housing.

10. The lubrication system according to claim 9, wherein the lubricating unit is electrically connected to the ignition of the vehicle.

11. The lubrication system according to claim 10, wherein the input and display device has its own power supply.

12. The lubrication system according to claim 3, wherein the signaling display is activated by the microprocessor with a frequency depending on the respective system status.

13. The lubrication system according to claim 2, wherein at most one connection for the electric power supply and one connection each for the push button and the signaling display are provided at the lubricating unit.

14. The lubrication system according to claim 2, wherein connections of the electric power supply, the push button, and the signaling display are combined in a single common plug.

15. The lubrication system according to claim 1, wherein a level switch is arranged on the lubricant reservoir, which cooperates with the signaling display.

16. The lubrication system according to claim 1, wherein the components of the lubricating unit are arranged in a common housing.

17. The lubrication system according to claim 1, wherein the lubricating unit is electrically connected to the ignition of the vehicle.

18. The lubrication system according to claim 1, wherein the input and display device has its own power supply.

19. The lubrication system according to claim 1, wherein the intermediate lubrication can be done one or more of before and during driving of the vehicle, and wherein selecting one of the at least two different lubrication programs can only be done when the ignition is switched on and the vehicle's motor is off in order to prevent an unintentional changing of the lubrication while driving.

20. A lubrication system for a utility vehicle, comprising: a lubricating unit, comprising a lubricant reservoir, a pump, and a distributor attached thereto, to which supply lines to a plurality of lubrication points can be attached, and a control module with at least two lubrication programs stored therein, wherein the pump initiates an ejection of grease in a cycle predetermined by one of the at least two different lubrication programs, wherein the lubricating unit is connected directly to an input and display device disposed in a driver's cabin or another accessible location of the vehicle, by which a switching between the lubrication programs and an initiating of an intermediate lubrication is done, wherein the input and display device has its own power supply, and wherein the own power supply of the input and display device consists of a battery located in the input and display device or a connection directly from the input and displaying device to the power supply of the vehicle.

21. a lubrication system for a utility vehicle, comprising: a lubricating unit, comprising a lubricant reservoir, a pump, a distributor attached thereto, to which supply lines to a plurality of lubrication points can be attached, and a control module with at least two lubrication programs stored therein, wherein the pump initiates an ejection of grease in a cycle predetermined by one of the at least two different lubrication programs each having different intervals of time for activating the pump, wherein the lubricating unit is connected directly to an input and display device disposed in a driver's cabin or another accessible location of the vehicle, by which a switching between the lubrication programs and an initiating of an intermediate lubrication is done, wherein the intermediate lubrication is initiated by the driver during the driving operation and occurs independently of one of the at least two different lubrication programs that is being used.

* * * * *